United States Patent
Fuse

(10) Patent No.: US 10,649,386 B2
(45) Date of Patent: May 12, 2020

(54) DRIVING DEVICE AND IMAGE FORMING APPARATUS

(71) Applicant: CANON KABUSHIKI KAISHA, Tokyo (JP)

(72) Inventor: Yasuhiko Fuse, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 15/712,730

(22) Filed: Sep. 22, 2017

(65) Prior Publication Data
US 2018/0088518 A1    Mar. 29, 2018

(30) Foreign Application Priority Data
Sep. 29, 2016   (JP) .................................. 2016-190679

(51) Int. Cl.
G03G 15/00     (2006.01)
G03G 21/16     (2006.01)
F16H 57/023    (2012.01)

(52) U.S. Cl.
CPC ......... *G03G 15/757* (2013.01); *F16H 57/023* (2013.01); *G03G 15/6529* (2013.01); *G03G 21/1647* (2013.01); *G03G 2215/00679* (2013.01); *G03G 2221/1657* (2013.01)

(58) Field of Classification Search
CPC ............. G03G 15/757; G03G 15/6529; G03G 21/1647; G03G 2215/00679; G03G 2221/1657; F16H 57/023
See application file for complete search history.

(56) References Cited

U.S. PATENT DOCUMENTS

| | | | |
|---|---|---|---|
| 2002/0098008 A1* | 7/2002 | Tashiro | G03G 15/00 399/107 |
| 2005/0146090 A1* | 7/2005 | Sawai | B65H 5/06 271/264 |
| 2009/0226235 A1* | 9/2009 | Kobayashi | B41J 15/04 400/614 |

FOREIGN PATENT DOCUMENTS

| | | |
|---|---|---|
| JP | H04-366056 A | 12/1992 |
| JP | 2003-084521 A | 3/2003 |
| JP | 2008-158080 A | 7/2008 |
| JP | 2008-220132 A | 9/2008 |

* cited by examiner

*Primary Examiner* — David H Banh
(74) *Attorney, Agent, or Firm* — Venable LLP

(57) ABSTRACT

A driving device includes a motor; a stay supporting the motor; a gear configured to receive a driving force from the motor; and a supporting shaft rotatably supporting the gear, the supporting shaft being supported by the stay. The supporting shaft stands at a side of the stay opposite from a side thereof where the stay supports the motor. The stay supports the motor in a first region and supports the supporting shaft in a second region offset from the first region in a direction of being away from the motor.

11 Claims, 13 Drawing Sheets

(a)

(b)

(a)

(b)

DRIVING DEVICE AND IMAGE FORMING APPARATUS

FIELD OF THE INVENTION AND RELATED ART

The present invention relates to a driving device suitable for an image forming apparatus, and relates to the image forming apparatus such as an electrophotographic copying machine or an electrophotographic printer (for example, a laser beam printer, an LED printer or the like).

Conventionally, as an image forming apparatus of an electrophotographic type, an image forming apparatus of a type in which a sheet is fed from a sheet feeding unit to an image forming portion and thereafter is fed through a fixing device and thus an image is formed has become widespread. In such an image forming apparatus, drive of respective rollers and units is controlled so that desired operations of the rollers and the units are performed using some stepping motors, DC motors or the like.

Here, use of the motors for drive control cannot avoid harsh situations. For example, a constitution in which the number of motors used in the image forming apparatus is reduced to the extent possible in order to reduce a cost is increasing. In this constitution respective portions are driven and controlled by branding a driving train from a single motor. For this reason, a load exerted on the single motor tends to increase.

Thereafter, from a viewpoint of a service property during failure (breakdown) with an increase in load, a constitution for improving an exchange property (exchangeability) of the motor has been conventionally proposed. Japanese Laid-Open Patent Application (JP-A) 2008-158080 discloses a constitution of a stay to which a motor and a drive transmission member, such as an idler gear, is mounted. The idler gear is subjected to drive transmission from the motor. The stay, motor, and idler gear are assembled into a unit, as a driving device and are separated in advance from a side plate constituting a casing of the image forming apparatus. As a result, in the case where there is a malfunction of the motor, the driving device is exchanged and thus the motor can be exchanged, so that the exchange property of the motor is improved.

When downsizing of a main assembly of the image forming apparatus is caused to progress, an inside driving device is also necessarily downsized, so that the motor and a driving gear train are also densely arranged. For this reason the motor, the idler gear and the like are held (supported) by the stay with a dense arrangement of respective members, as in the constitution disclosed in JP-A 2008-158080 for example. In this arrangement, a stay in addition to the stay to which the motor is positionally mounted, is separately provided in some cases. A supporting shaft of the idler gear is positionally mounted on this separate stay.

However, in the case where the motor and the supporting shaft of the idler gear are positioned by separate stays, there is a liability that the idler gear and a pinion gear of the motor are cut of alignment and thus stability of an operation lowers.

SUMMARY OF THE INVENTION

The present invention has been accomplished in view of the above-described circumferences. A principal object of the present invention is to provide a driving device capable of not only meeting downsizing of the driving device but also realizing a stable operation property.

According to an aspect of the present invention, there is provided a driving device comprising: a motor; a stay supporting the motor; a gear configured to receive a driving force from the motor; and a supporting shaft rotatably supporting the gear, the supporting shaft being supported by the stay, wherein the supporting shaft stands at a side of the stay opposite from a side thereof where the stay supports the motor, and wherein the stay supports the motor in a first region and supports the supporting shaft in a second region offset from the first region in a direction of being away from the motor.

According to another aspect of the present invention, there is provided a driving device comprising: a motor; a first metal plate supporting the motor; a second metal plate provided on a surface opposite from a surface where the first metal plate supports the motor; a gear configured to receive a driving force from the motor; and a supporting shaft rotatably supporting the gear, the supporting shaft being supported by the second metal plate, wherein the first metal plate is provided with a hole for permitting penetration of the supporting shaft through the hole, and wherein the first metal plate supports the motor in a first region and is provided with the hole in a second region offset from the first region in a direction of being away from the motor.

Further features of the present invention will become apparent from the following description of exemplary embodiments with reference to the attached drawings.

Figure 4:
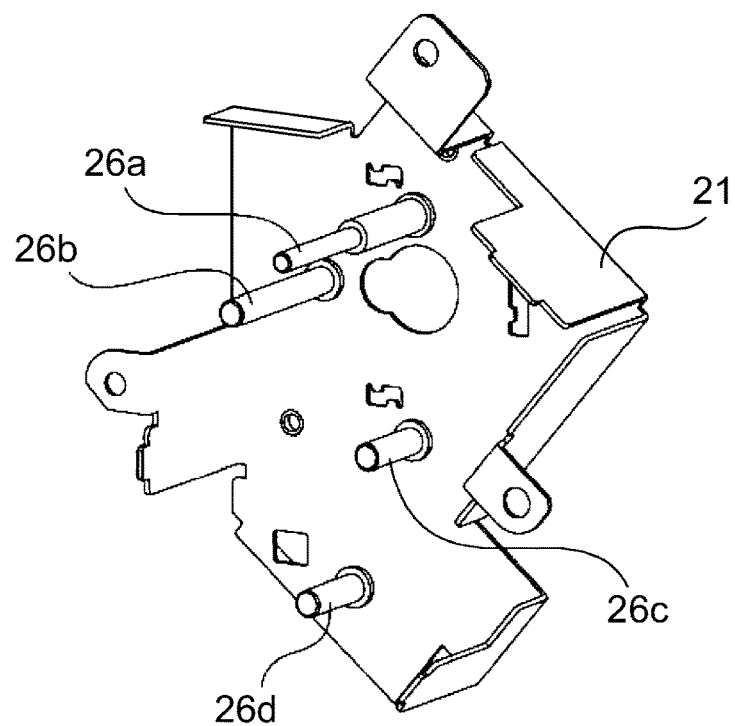
Figure 4:
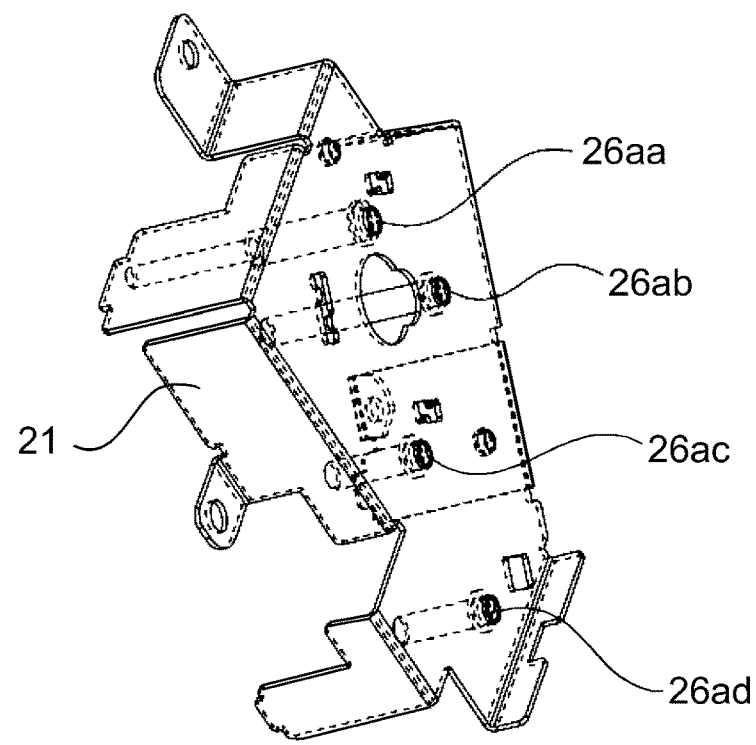

Parts (a) and (b) of FIG. 4 are schematic perspective views of a stay provided in the conventional sheet feeding driving unit.

Figure 5:
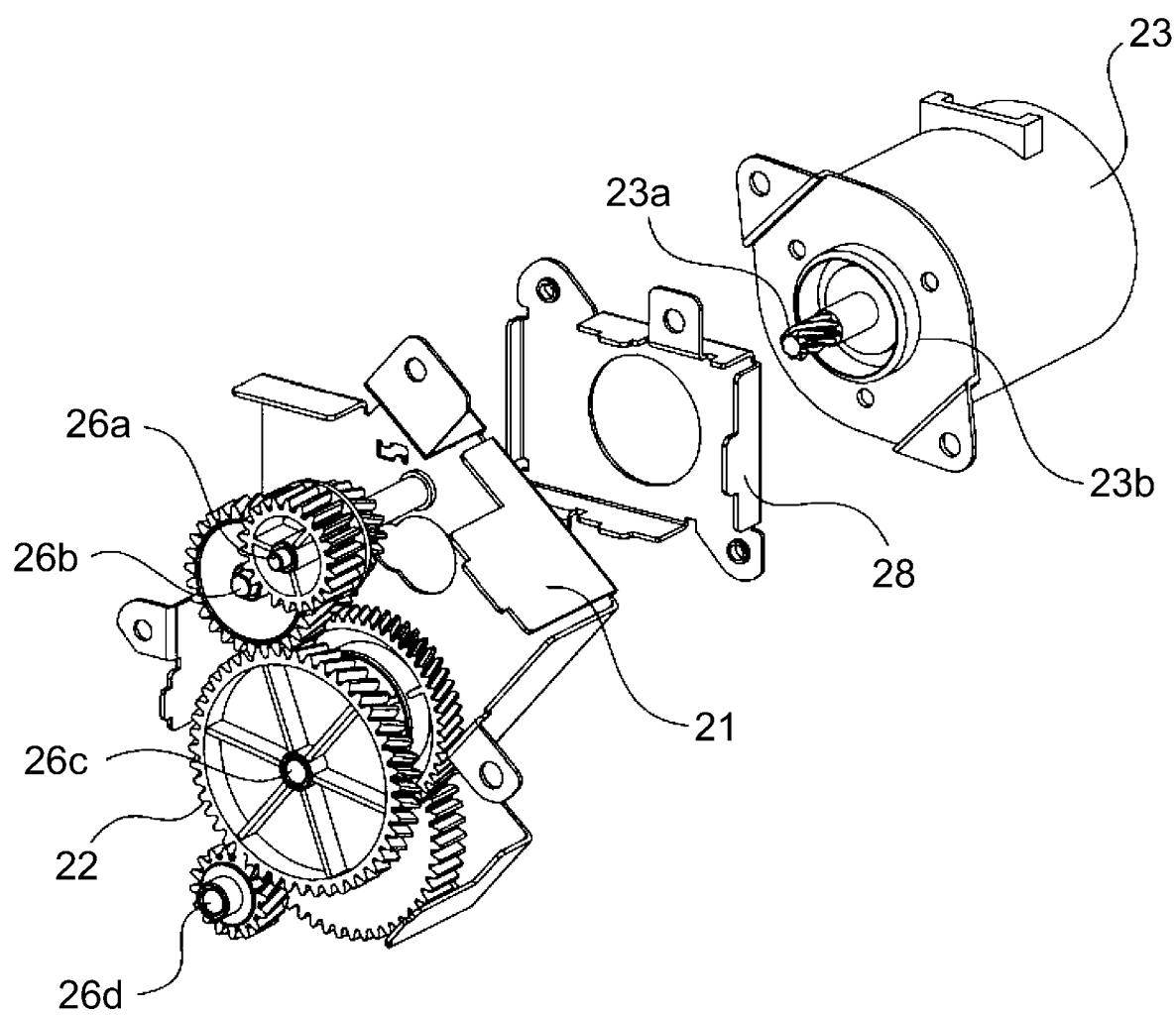

FIG. 5 is an exploded perspective view of the conventional sheet feeding driving unit.

Figure 6:
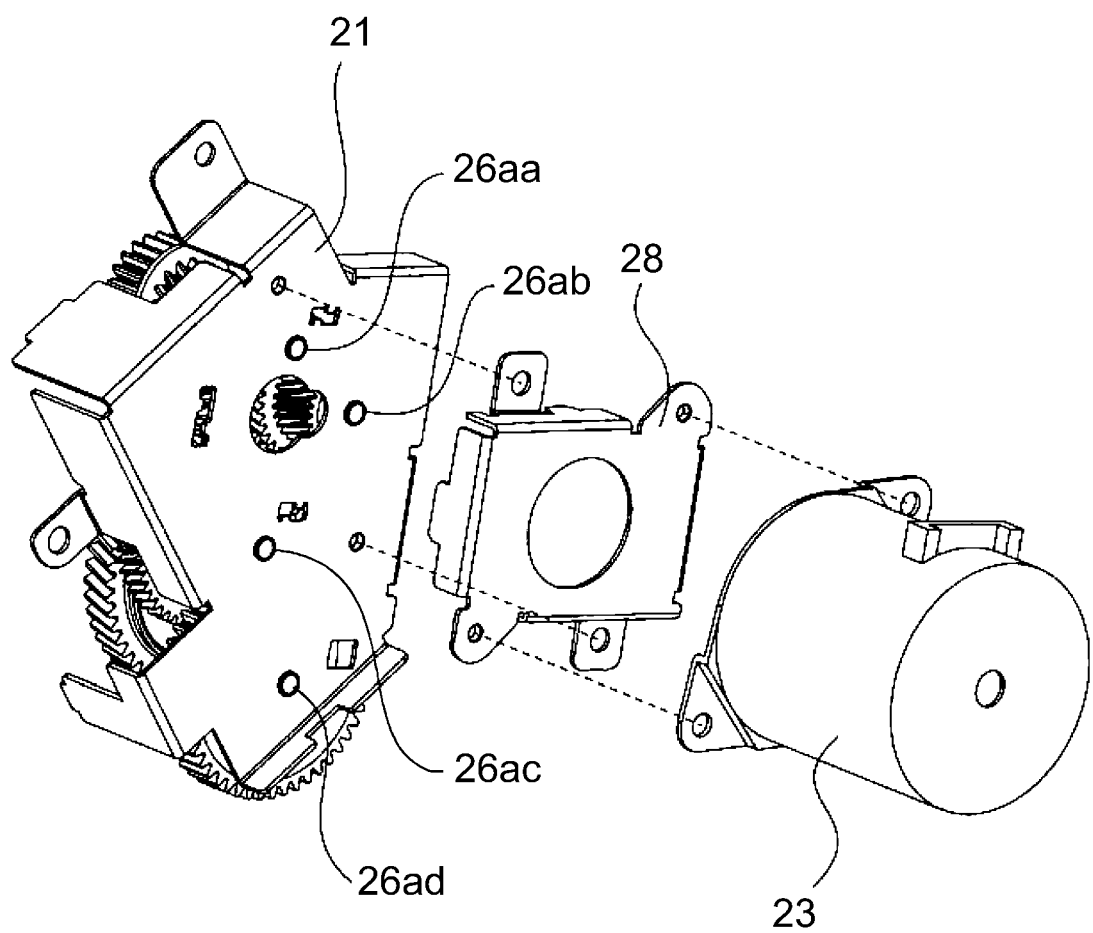

FIG. 6 is an exploded perspective view of the conventional sheet feeding driving unit.

Figure 7:
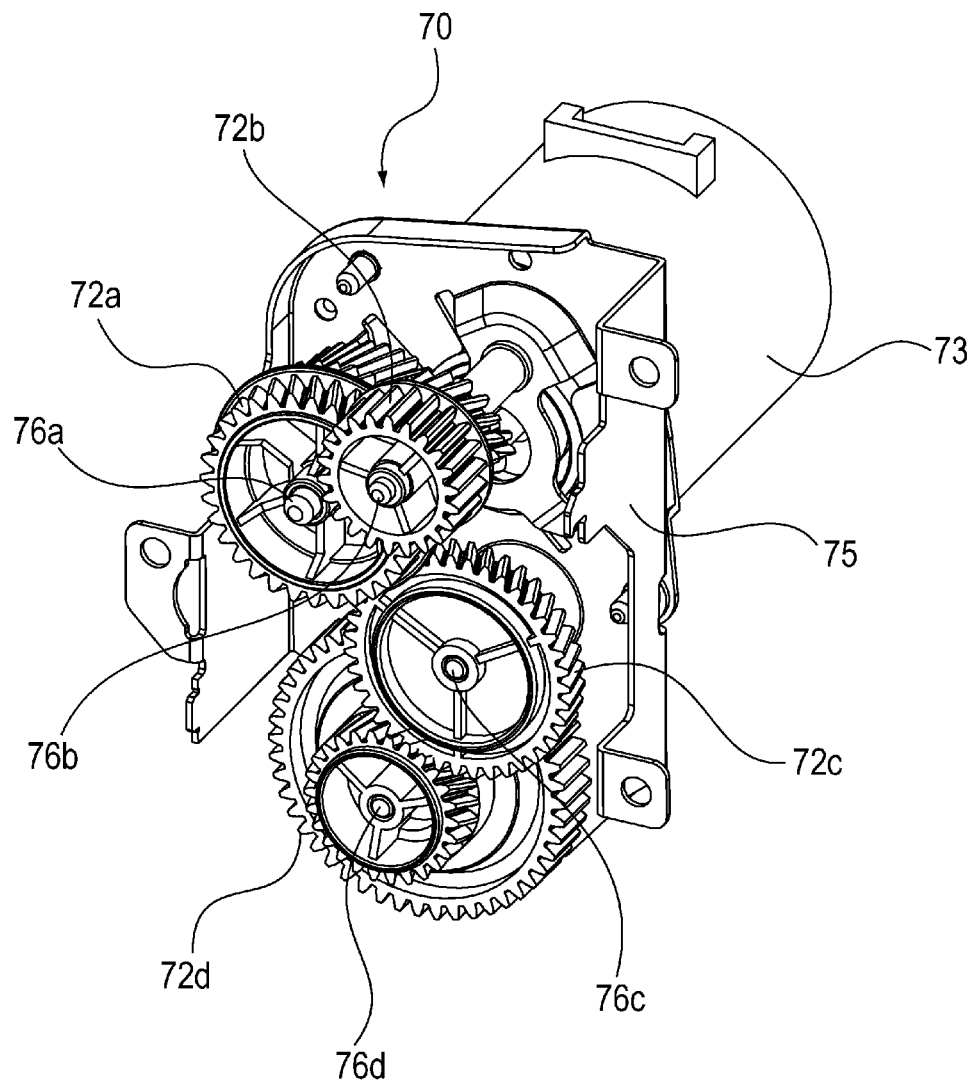

FIG. 7 is a schematic perspective view of a sheet feeding driving unit in a first embodiment of the invention.

Figure 8:
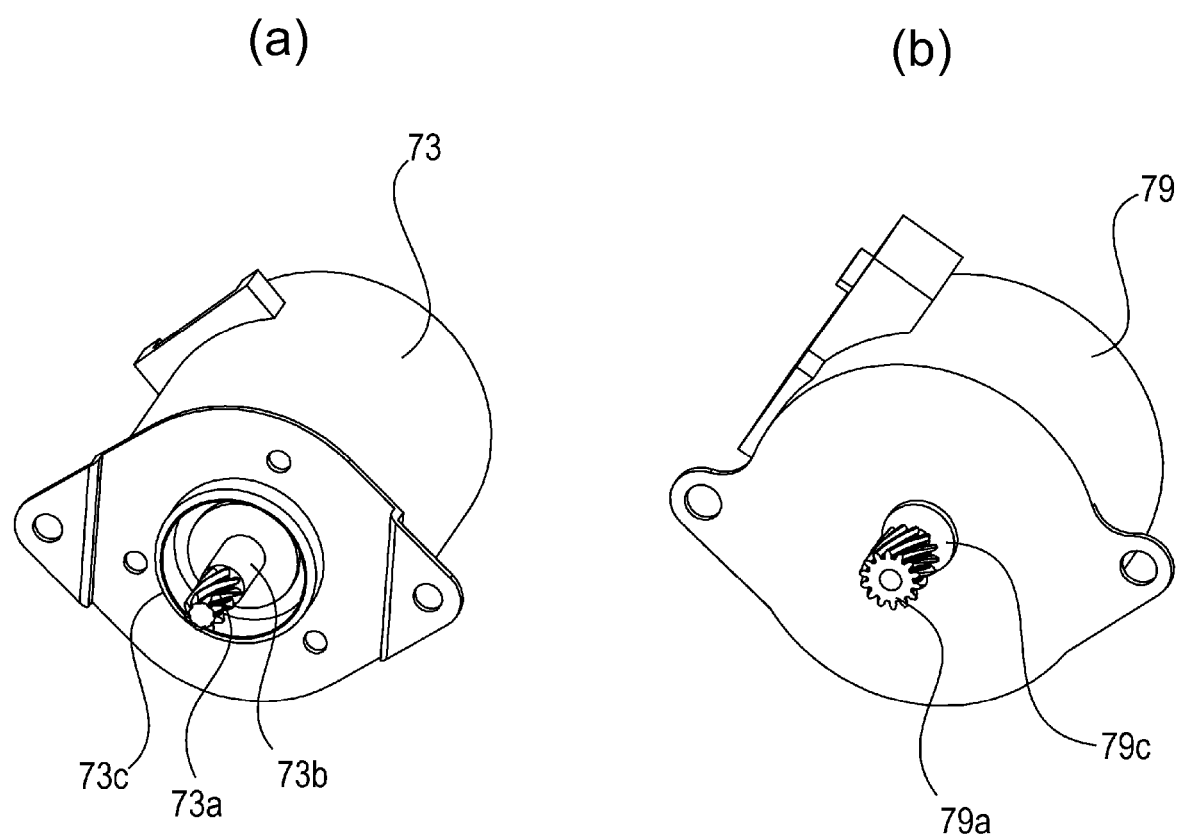

Parts (a) and (b) of FIG. 8 are schematic perspective views each showing a motor in the first embodiment.

Figure 9:
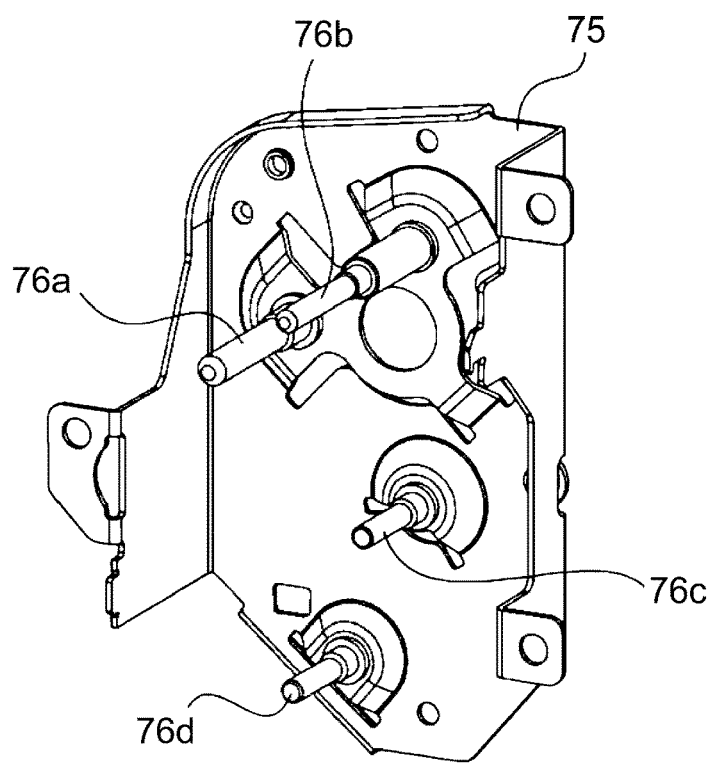
Figure 9:
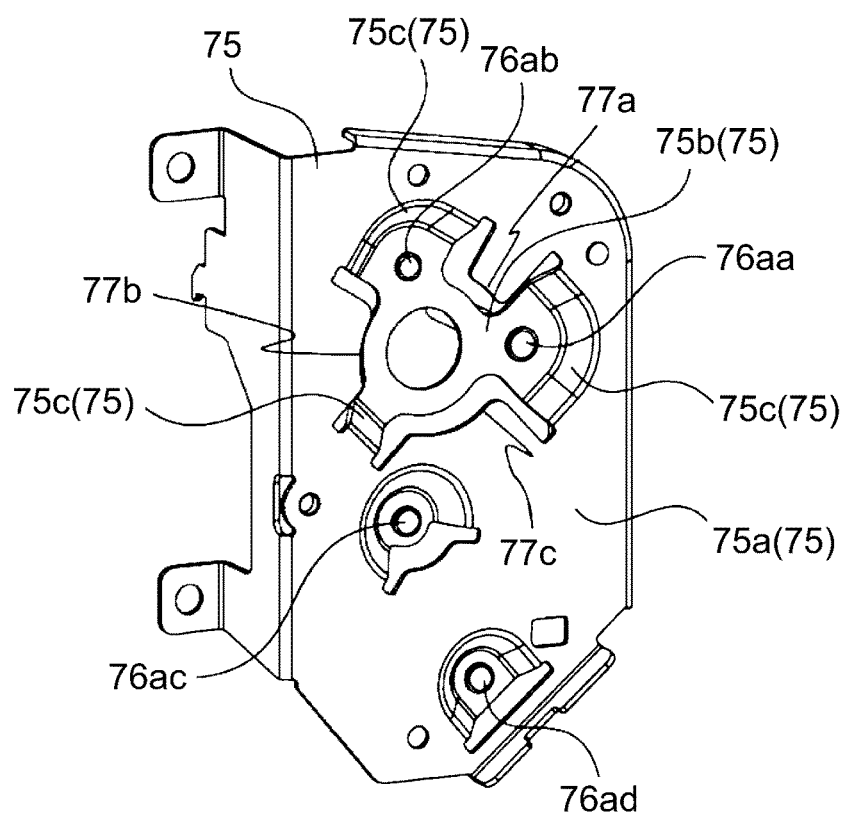

Parts (a) and (b) of FIG. 9 are schematic perspective views of a stay provided in the sheet feeding driving unit in the first embodiment.

Figure 10:
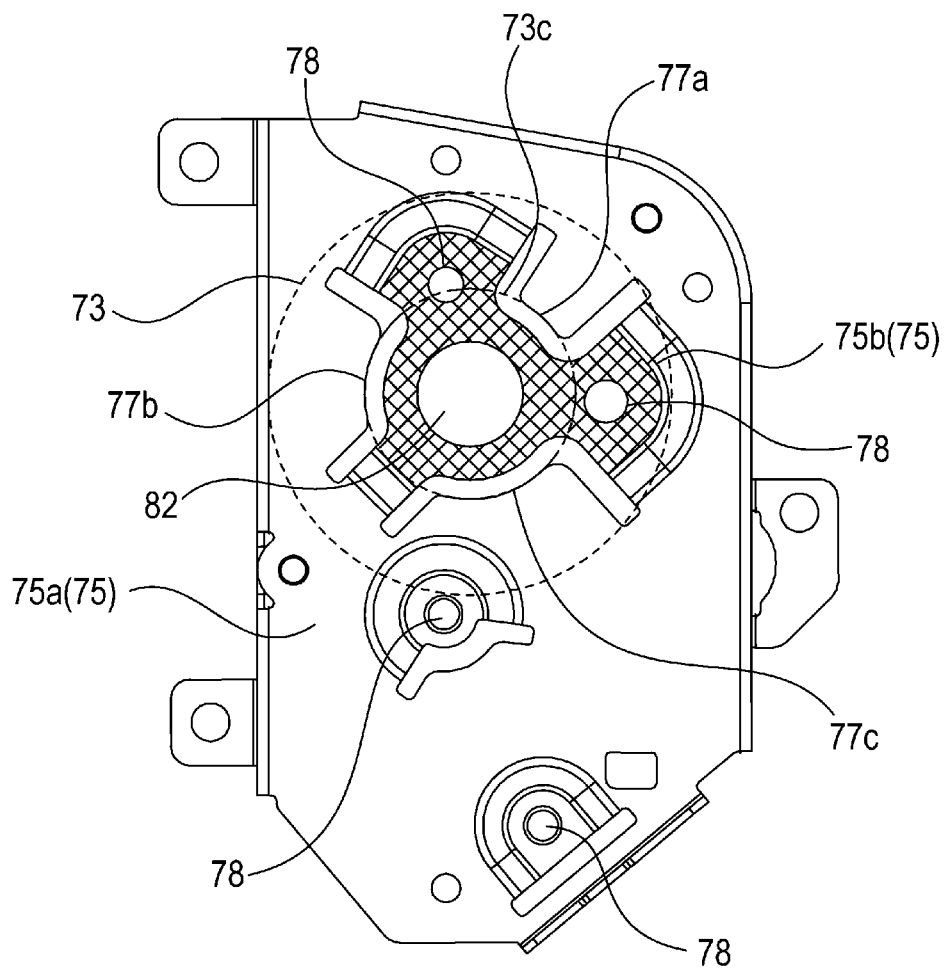

FIG. 10 is a front view of the stay provided in the sheet feeding driving unit in the first embodiment.

Figure 11:
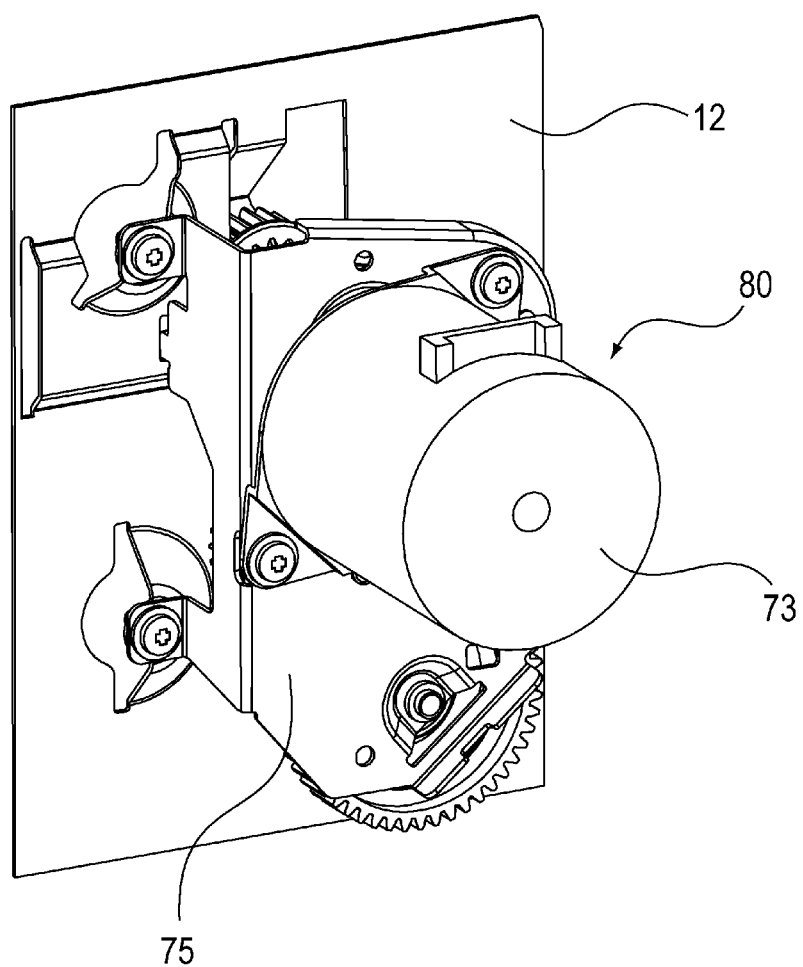

FIG. 11 is a schematic perspective view of a sheet feeding driving unit in a second embodiment of the invention.

Figure 12:
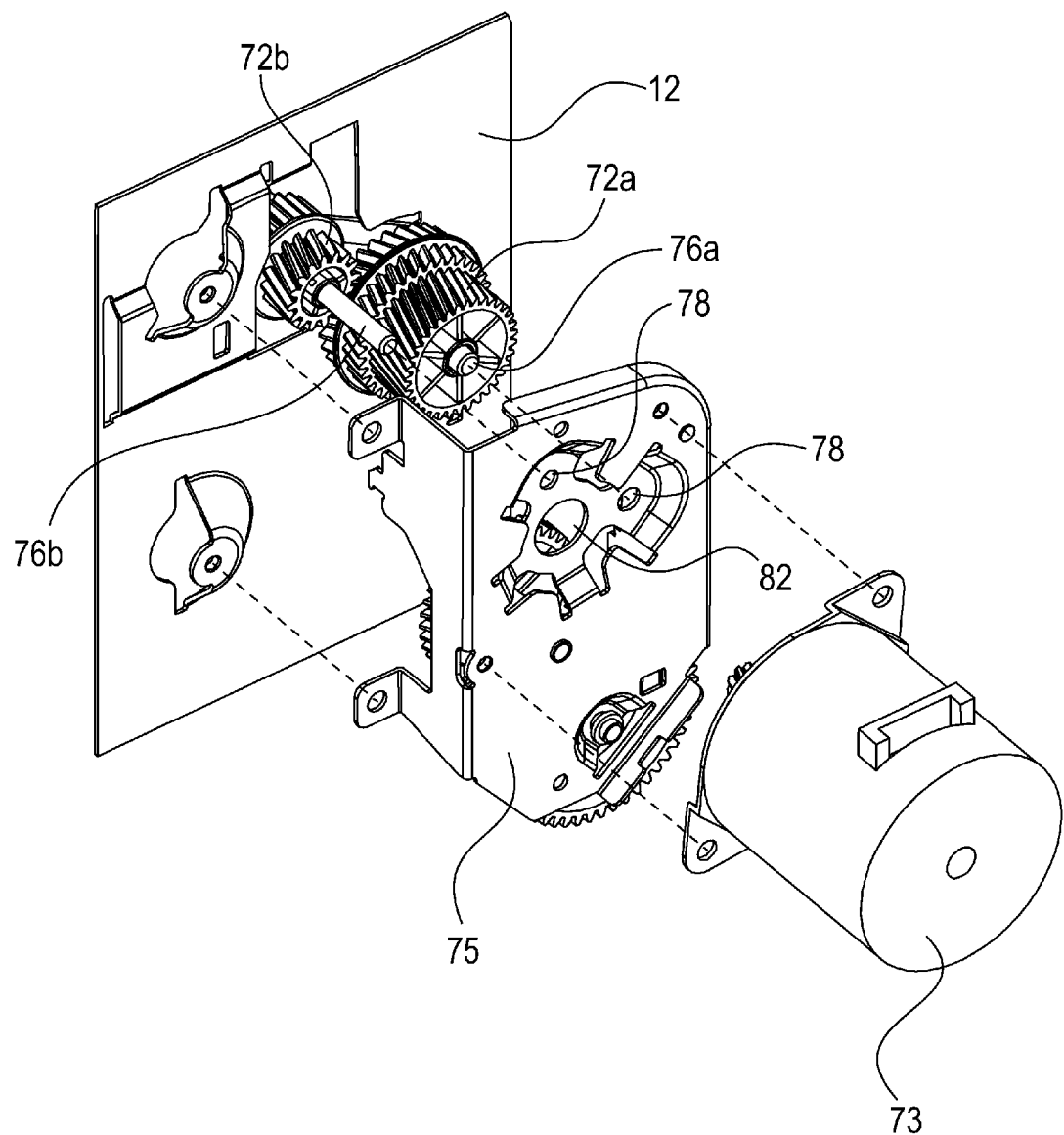

FIG. 12 is an exploded perspective view of the sheet feeding driving unit in the second embodiment.

Figure 13:
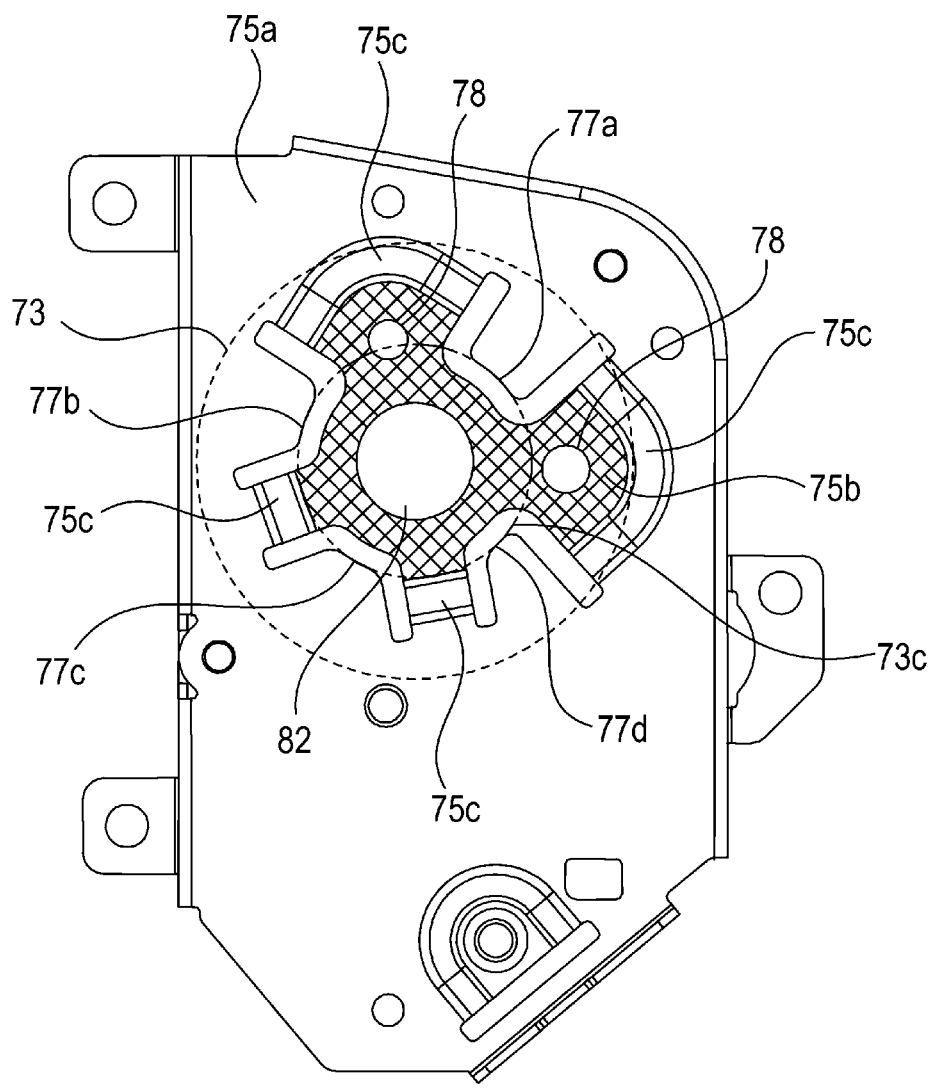

FIG. 13 is a front view of a stay provided in the sheet feeding driving unit in the second embodiment.

DESCRIPTION OF EMBODIMENTS

First Embodiment

<Image Forming Apparatus>

First, a general structure of an image forming apparatus A including a driving device according to a first embodiment of the present invention will be described together with an operation of the image forming apparatus A with reference to the drawings. Incidentally, dimensions, materials, shapes, relative arrangement and the like of constituent elements described in the following embodiments are not intended to limit the scope of the present invention only thereto unless otherwise specified.

The image forming apparatus A is a color image forming apparatus of an intermediary transfer tandem type in which toners (toner images) of four colors of yellow Y, magenta M, cyan C and black K are primary-transferred onto an intermediary transfer belt and then are secondary-transferred onto a sheet S (recording material or medium), and thus a (full-color) image is formed on the sheet S.

Figure 1:
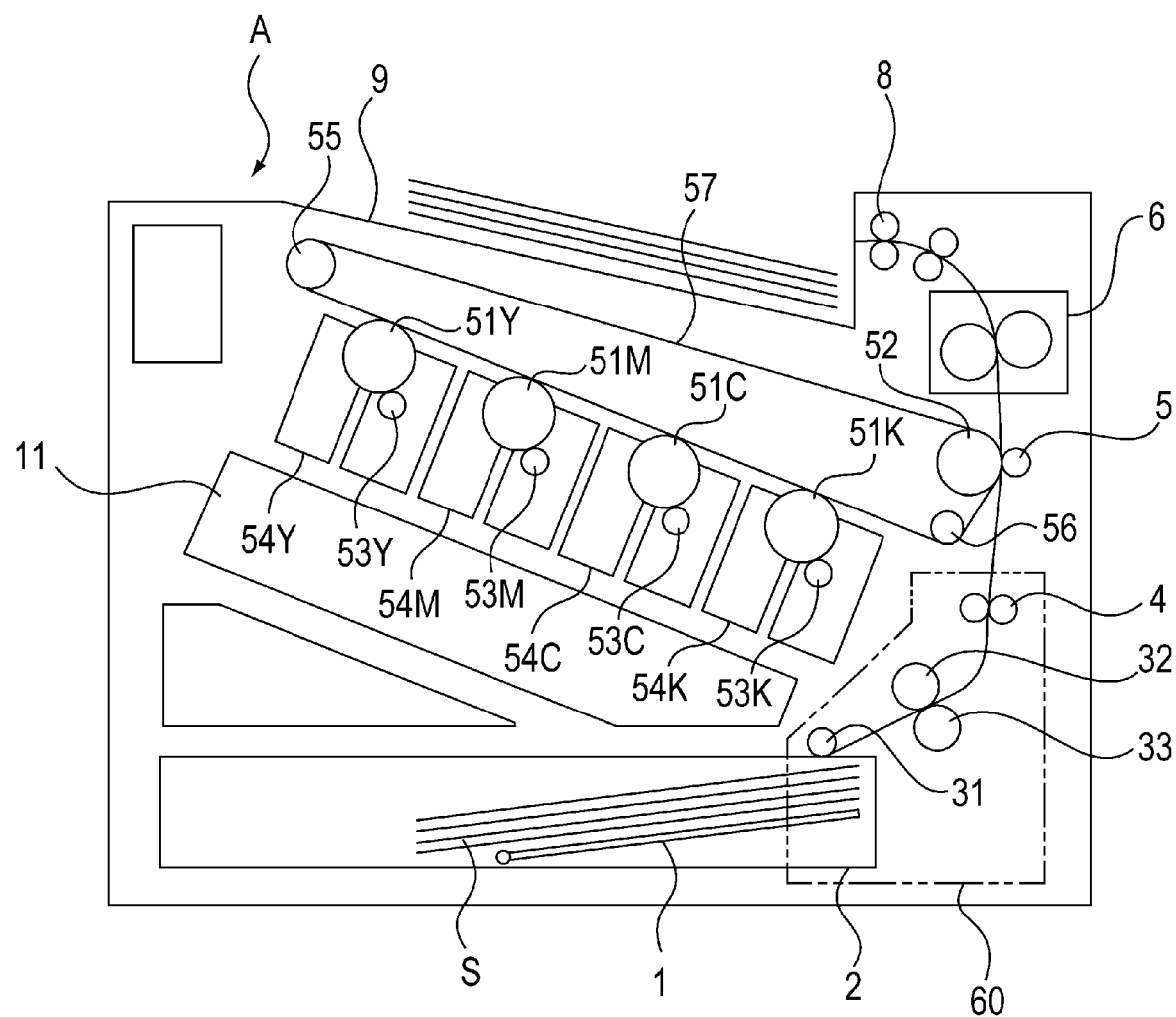
FIG. 1 is a schematic sectional view of an image forming apparatus.

As shown in FIG. 1, the image forming apparatus A includes an image forming portion for transferring toner images onto the sheet S, a sheet feeding portion for feeding the sheet S to the image forming portion, and a fixing portion for fixing the toner images on the sheet S.

The sheet feeding portion includes a sheet feeding tray 2 for stacking and accommodating sheets S, a pick-up (picking) roller 31, a feeding roller 32, a separation roller 33, a registration roller pair 4 and the like. The sheet feeding tray 2 is provided with an intermediate plate 1 on which the sheets S are stacked. The intermediate plate 1 is lifted up depending on the number of the sheets S by a lift-up mechanism, and the sheet S is contacted to the pick-up roller 31 roughly at a certain pressure.

The image forming portion includes photosensitive drums 51 (51Y, 51M, 51C, 51K) and charging rollers 53 (53Y, 53M, 53C, 53K) for electrically charging the photosensitive drums 51. The image forming portion further includes an intermediary transfer unit, a laser scanner unit 11 and developing devices 54 (54Y, 54M, 54C, 54K).

The intermediary transfer unit includes an endless cylindrical intermediary transfer belt 57, primary transfer rollers (not shown) provided opposed to the photosensitive drums 51 through the intermediary transfer belt 57, a secondary transfer roller 5, a secondary transfer opposite roller 52 and the like. The intermediary transfer belt 57 is stretched by the secondary transfer opposite roller 52, a first stretching roller 55 and a second stretching roller 56, and is rotated by receiving a driving force.

For image formation when an unshown controller sends a print signal, first, an uppermost sheet S in the sheet feeding tray 2 is picked-up by the pick-up roller 31 and is sent to the registration roller pair 4 by the feeding roller 32 while being separated on a single-sheet basis by the separation roller 33. The registration roller pair 4 sends the sheet S to the image forming portion by adjusting a feeding speed in order to be timed to an operation of the image forming portion by detecting a leading end portion of the sheet S with an unshown sensor.

On the other hand, in the image forming portion, first, each of the surfaces of the photosensitive drums 51 is electrically charged by the charging roller 53. Thereafter, the surface of the photosensitive drum 51 is irradiated with laser light emitted from an unshown light source of the laser scanner unit 11 depending on image information, so that an electrostatic latent image is formed on the surface of the photosensitive drum 51. Toner is deposited on the electrostatic latent image by the developing device 54, so that the electrostatic latent image is developed into a toner image and thus the toner image is formed on the surface of the photosensitive drum 51.

The resultant toner images are primary-transferred from the photosensitive drums 51 onto the intermediary transfer belt 57, at primary transfer nips each formed by the photosensitive drum 51 and the unshown primary transfer roller, under application of a primary transfer bias to the primary transfer roller.

Thereafter, by the rotation of the intermediary transfer belt 57, the toner images reach a secondary transfer portion formed by the secondary transfer roller 5 and the secondary transfer opposite roller 52 which is disposed in a downstream side with respect to the rotational direction. At the secondary transfer portion, a secondary transfer bias is applied to the secondary transfer roller 5, so that the toner images are transferred from the intermediary transfer belt 57 onto the sheet S.

The sheet S on which the toner images are transferred is sent to the fixing device 6 and is heated and pressed by the fixing device 6, so that the toner images are fixed on the sheet S and thereafter the sheet S is discharged onto a discharge tray 9.

<Driving Device>

The above-described image forming operation is drive-controlled by some motors and a control board (panel) in the image forming apparatus A. Next, a constitution of a driving device for driving the respective rollers and the respective units will be described using a sheet feeding driving unit for driving the sheet feeding portion as an example.

<Conventional Sheet Feeding Driving Unit>

Figure 2:
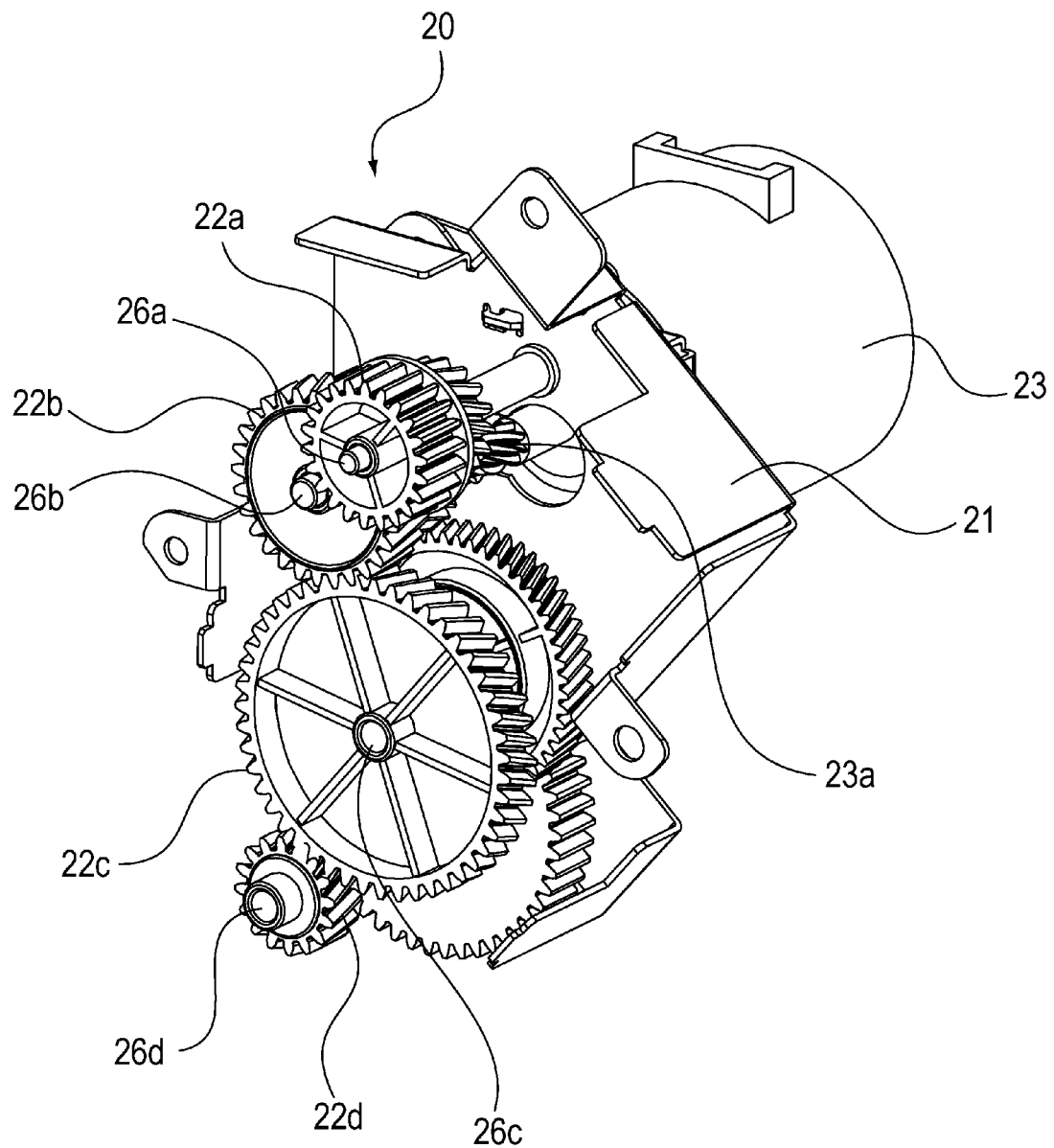
FIG. 2 is a schematic perspective view of a conventional sheet feeding driving unit.

First, a constitution of a device sheet feeding driving unit will be described. FIG. 2 is a schematic perspective view of a conventional sheet feeding driving unit 20. The sheet feeding driving unit 20 includes a stay 21, a motor 23 and idler gears (22a-22d) subjected to drive transmission from the motor 23. The idler gears 22 are rotatably supported by four metal-made supporting shafts 26 (26a-26d).

The stay 21 is formed with a metal plate. This is because there is a liability that when the motor 23 is rotated at a high speed, the motor 23 itself further generates heat and a temperature thereof exceeds an operation guarantee temperature of the motor 23 itself or temperatures of respective peripheral portions of the motor 23 and thus various inconveniences are caused. For this reason, a member to which the motor 23 is mounted is required to ensure a heat dissipation cooling effect to the extent possible by selecting a metal material having a good thermal conductivity.

Figure 3:
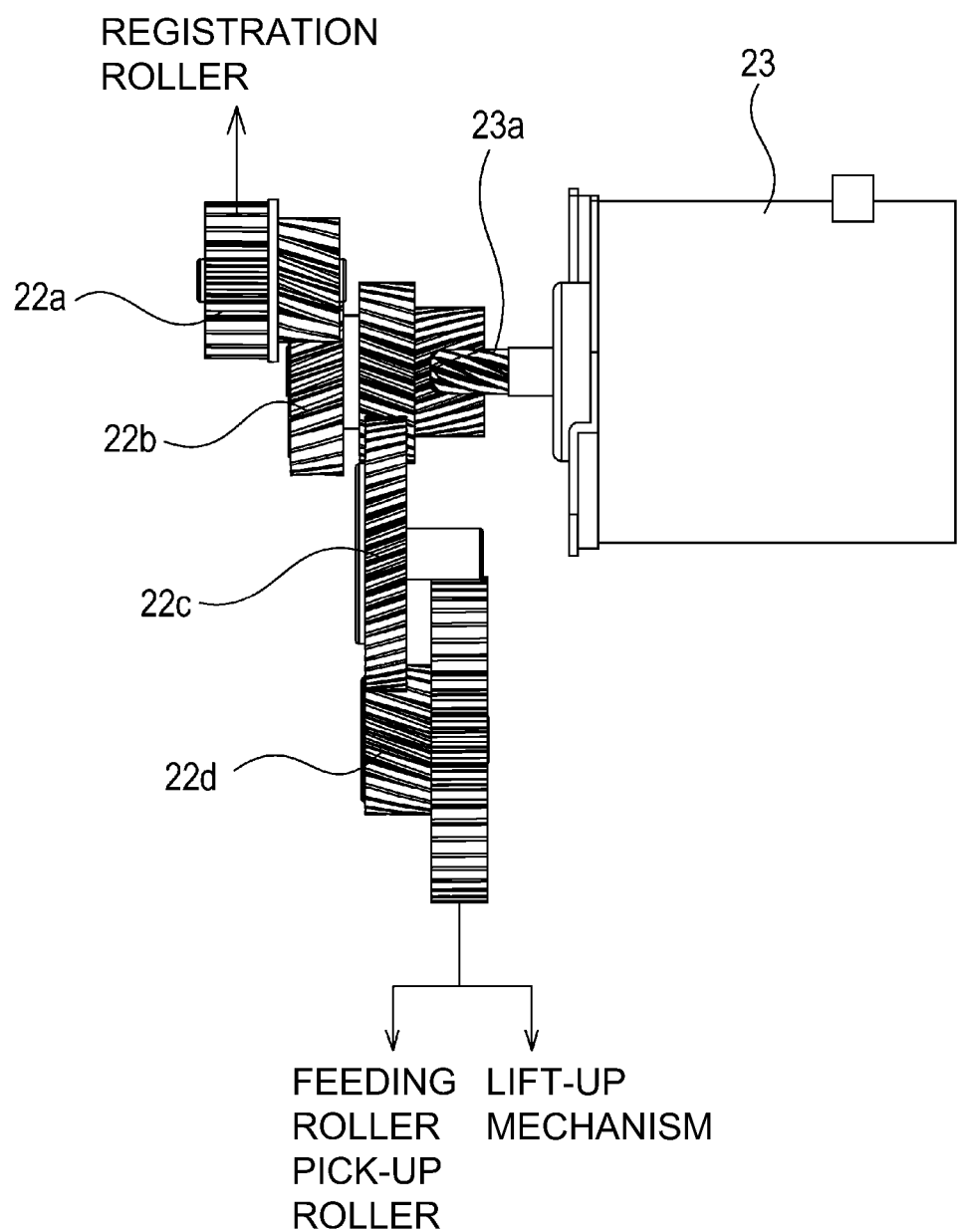
FIG. 3 is a side view of the conventional sheet feeding driving unit.

FIG. 3 is a side view, of the conventional sheet feeding driving unit 20, for illustrating a branch of drive transmission. Incidentally, for convenience of explanation, in FIG. 3, the stay 21 is omitted from illustration. As shown in FIG. 3, a pinion gear 23a of the motor 23 is connected with the idler gear 22b. Further, the idler gear 22b is connected with the idler gears 22a, 22c and 22d. A driving force of the motor 23 is transmitted to a lift-up mechanism for lifting up the intermediary plate 1, the pick-up roller 31, the feeding roller 32 and the registration roller pair 4 through the pinion gear 23a and the idler gears 22a-22d (FIG. 1).

Incidentally, a chain double-dashed line 60 in FIG. 1 represents an imaginary object range of the portions driven by the sheet feeding driving unit 20. In these days, as described above, many constituent parts and rollers are rotated by a single motor, so that a desired operation is realized. For this reason, a load required for the motor necessarily tends to increase.

Next, an assembling constitution of the conventional sheet feeding driving unit 20 will be described. Parts (a) and (b) of FIG. 4 are schematic perspective views each showing the stay 21 provided in the conventional sheet feeding driving unit 20. Part (a) of FIG. 4 shows the idler gear 22 side, and part (b) of FIG. 4 shows the motor 23 side. FIG.

4 corresponds to the drawing of FIG. 2 from which the motor 23 and the idler gears 22 are omitted.

As shown in FIG. 4, the four supporting shafts 26 (26a-26d), formed of metal, for supporting the idler gears 22 penetrate through holes formed in the stay 21 and are positioned and then are integrally mounted to the stay 21 by drawing (process). In the drawing, end portions of the shafts are pressed by an exclusive processing machine so that the shafts are crushed and spread in a flange shape and are fixed. For this reason, flange-shaped fixing portions 26aa-26ad always remain at the end portions of the supporting shafts 26, so that finished parts are projected from the surface of the stay 21 by about 0.3 mm to 0.5 mm by the presence of the fixing portions 26aa-26ad.

FIGS. 5 and 6 are exploded perspective views showing the conventional sheet feeding driving unit 20. As shown in FIGS. 5 and 6, in the conventional sheet feeding driving unit 20, between the stay 21 and the motor 23, a second stay 28 is provided so as to be superposed on the stay 21. As a result, an interference of the fixing portions 26aa-26ad, of the supporting shafts 26 projecting from the surface of the stay 21, with a casing of the motor 23 is avoided.

Further, the second stay 28 is provided with a circular hole so as to have a fitting (engaging) dimensional relationship with a flange portion 23b of the motor 23. For this reason, the motor 23 is uniquely positioned and fixed to the stay 21 through the second stay 28.

However, in a constitution in which the motor 23 and the idler gears 22 are mounted to the plurality of stays, the number of parts increases and leads to an increase of production cost. In addition, the following problems arise.

That is, in the case where in an assembling process, the respective stays are out of alignment, the pinion gear 23a of the motor 23 and the idler gear 22 are also out of alignment and thus stability of an operation lowers, so that there is a liability that engaging noise becomes large. Further, vibration during the operation of the motor 23 causes a resonance phenomenon between the stays including a casing frame, so that there is a liability that an increase in operation noise is caused. Further, compared with a constitution in which the stays are formed with a single plate, so that there is a liability that a heat dissipation cooling effect for cooling the motor 23 generating hole lowers.

Therefore, in this embodiment, the above-described problems are solved by devising the shape of the stay. In the following, a constitution of a sheet feeding driving unit in this embodiment will be described.

<Sheet Feeding Driving Unit>

FIG. 7 is a schematic perspective view of a sheet feeding driving unit (driving device) 70 in this embodiment. As shown in FIG. 7, the sheet feeding driving unit 70 includes a motor 73, a stay 75 formed with a metal plate to which the motor 73 is mounted, and idler gears 72 (72a-72d) subjected to drive transmission from the motor 73. Further, the idler gears 72 are rotatably supported by metal-made four supporting shafts 76 (76a-76d).

Further, similarly as the case of the conventional sheet feeding driving unit 20 described above, a driving force of the motor 73 is transmitted to the lift-up mechanism for lifting up the intermediary plate 1, the pick-up roller 31, the feeding roller 32 and the registration roller pair 4 through the idler gears 72a-72d (FIG. 1).

Next, the motor 73 will be described. The motor 73 of the sheet feeding driving unit 70, depending on required specifications and conditions and the like, may be a stepping motor and may be a DC motor.

In this embodiment, a motor including a casing having a size of about 40 mm-50 mm in diameter is used. As regards the motor having this size, the stepping motor is used at a rotation frequency of about 300 rpm-1500 rpm, but the DC motor can be used at a rotation frequency of about 300 rpm-4000 rpm (which is a high rotation frequency).

In recent years, with improvement in process speed of the image forming apparatus, there is a need that also the motor is rotated at a high speed, and therefore, even at a portion where the stepping motor has been conventionally used, the DC motor may have to be used. Also in this embodiment, from the viewpoint of necessity of rotation at the high speed, a brushless DC motor is selected as the motor 73.

Parts (a) and (b) of FIG. 8 are schematic perspective views showing the motor 73 (DC motor) and a stepping motor 79, respectively. The stepping motor 79 has a casing size equal to that of the motor 73. As shown in FIG. 8, a flange portion (spigot) 73c of the motor 73 is larger in diameter than a flange portion 79c of the stepping motor 79. This is because the rotation frequency of the DC motor in operation is much higher than that of the stepping motor, and therefore, from the viewpoint of durability, as a bearing at a driving shaft of the motor, a rolling (antifriction) bearing such as a ball bearing is used as a bearing for the driving shaft of the motor. In this case, compared with a sliding (plain) bearing formed of a resin material or a sintered material, an outer diameter of the bearing becomes large. In most of cases, positioning of the motor is performed using a part of the bearing of the driving shaft, and therefore, when the outer diameter of the bearing is increased as described above, the flange portion also increases in size.

In this embodiment, the flange portion 73c of the motor 73 is 22 mm in diameter. The flange portion 79c of the stepping motor 79 is 10 mm in diameter. Further, the motor 73 is provided with an encoder coaxially with a driving shaft 73b, so that a rotation status of the motor 73 can be electrically controlled and monitored.

Then, a shape of the stay 75 provided in the sheet feeding driving unit 70 will be described.

Parts (a) and (b) of FIG. 9 are schematic perspective views of the stay 75, in which part (a) shows the idler gear 72 side of the stay 75, and part (b) shows the motor 73 side. As shown in FIG. 9, the metal-made four supporting shafts 76 (76a-76d) for supporting the idler gears 72 penetrates through holes (FIG. 10) formed in the stay 75 and are positioned, and are integrally mounted to the stay 75 by drawing (process). That is, the supporting shafts 76 are fixed to the stay 75 at caulking portions 76aa, 76ab, 76ac and 76ad where end portions of the supporting shafts 76 are subjected to caulking.

FIG. 10 is a front view of the stay 75. Broken lines indicated in FIG. 10 show regions where a maximum outer diameter of the casing of the motor 73 and an outer diameter of the flange portion 73c are projected, respectively, when the motor 73 is mounted to the stay 75. As shown in FIG. 10, the motor 73 and the supporting shafts 76 are disposed at overlapping positions as seen in an axial direction of the supporting shafts 76.

Here, as shown in FIGS. 9 and 10, a second surface (second region) 75b (hatched portion of FIG. 10), of the stay 75, where the through holes 78 are formed, is uniformly offset from a first surface (first region) 75a, at a periphery of the second surface 75b, in parallel to the first surface 75a by subjecting the stay 75 to drawing (process) at three drawing portions 75c. Further, the second surface 75b includes a hole 82 through which the driving shaft 73b of the motor 73 can penetrate.

Further, the first surface 75a is a surface to which the motor is mounted and is provided with three positioning portions 77 (77a, 77b, 77c) where the motor 73 is positioned. These positioning portions 77 have arcuate shapes at their free ends, and three arcuate lines thereof provide a dimensional relationship such that the arcuate lines provide the inner diameter and define a concentric circle. This inner diameter is the same as the diameter of the flange portion 73c (part (a) of FIG. 8), and the flange portion 73c engages with the positioning portions 77, so that the motor 73 is positioned relative to the stay 75 and is mounted to the first 75a.

That is, the stay has a two-layer structure by the drawing, in which the motor 73 is positioned and mounted to the first surface 75a and the second surface 75a is provided with the through holes 78 in which the supporting shafts 76 are positioned by penetration. Further, when the supporting shafts 76 and the motor 73 are mounted to the stay 75, in order to avoid an interference of the supporting shafts 76 with the motor 73, the second surface 75b in which the through holes 78 are formed is offset from the first surface 75a to which the motor 73 is mounted. That is, the first surface 75a and the second surface 75b of the stay 75 are somewhat shifted from each other and are connected with each other so that the caulking portions 76aa and 76ab of the supporting shafts 76 and the motor 73 do not interfere with each other.

As described above, a disposed surface of the supporting shafts 76 is offset from a disposed surface of the motor 73, so that a clearance is provided to avoid interference between the motor 73 and the caulking portions 76aa and 76ab of the supporting shafts 76. As a result, even in the case where the motor and a driving gear train are mutually disposed densely, with downsizing of the driving device, the motor 73 and the driving gear train such as the idler gears 72 can be laid out without separately providing another stay as in the conventional sheet feeding driving unit. Accordingly, it is possible to downsize the driving device and the image forming apparatus while maintaining a low cost.

Positioning the motor 73 and the supporting shafts 76 relative to each other by the same stay 75 in an assembling process, prevents an out-of-alignment condition of the pinion gear 73a of the motor 73 with the idler gear 72. For this reason, not only a stable operation property can be realized but also an increase in operation noise can be suppressed.

The motor 73 and the driving gear train can be laid out without separately providing another stay, and therefore, a cooling and heat dissipating effect of the motor 73 can be maintained by reducing a loss of heat conduction efficiency. Further, it is possible to prevent an increase in operation noise due to resonance vibration between the plurality of stays.

Further, the second surface 75b of the stay 75 is connected with the first surface 75a so that the driving shaft 73b of the motor 73 extends between the first surface 75a and the second surface 75b, and thus strength of torsional rigidity of the second surface 75b can be maintained. For this reason, strength of falling rigidity of the supporting shaft 76a, which is a supporting shaft where a load is largest, for supporting the idler gear 72a closest to the pinion gear 73a of the motor 73 can be maintained.

Second Embodiment

Next, Second Embodiment of the image forming apparatus A including the driving device according to the present invention will be described with reference to the drawings. Portions where the explanation is redundant between First and Second Embodiments are represented by the same reference numerals or symbols and will be omitted from description.

FIG. 11 is a schematic perspective view of a sheet feeding driving unit (driving device) 80 in this embodiment. As shown in FIG. 11, the motor 73 provided in the sheet feeding driving unit 80 is fixed, through a stay (first metal plate) 75, to a side plate (second metal plate) 12 constituting a casing frame of an image forming apparatus main assembly. The stay 75 is fixed to the side plate 12.

FIG. 12 is an exploded perspective view of the sheet feeding driving unit 80. As shown in FIG. 12, in this embodiment, supporting shafts 76 (76a, 76b) rotatably supporting the idler gears 72 are fixed to the side plate 21 by caulking (process) and are held (supported) by the side plate 12. On the other hand, the supporting shafts 76 (76a, 76b) are not fixed to the stay 75 and are positioned by being caused to penetrate through holes 78 formed in the stay 75.

FIG. 13 is a front view of the stay 75. Broken lines indicated in FIG. 13 show regions where a maximum outer diameter of the casing of the motor 73 and an outer diameter of the flange portion 73c are projected, respectively, when the motor 73 is mounted to the stay 75. As shown in FIG. 13, the motor 73 and the supporting shafts 76 are disposed at overlapping positions as seen in an axial direction of the supporting shafts 76.

Here, as shown in FIGS. 12 and 13, a second surface 75b (hatched portion of FIG. 13), of the stay 75, where the through holes 78 are formed, is uniformly offset from a first surface 75a, at a periphery of the second surface 75b, in parallel to the first surface 75a by subjecting the stay 75 to drawing (process) at four drawing portions 75c. Further, the second surface 75b includes a hole 82 through which the driving shaft 73b of the motor 73 can penetrate.

Further, the first surface 75a is a surface to which the motor is mounted and is provided with four positioning portions 77 (77a, 77b, 77c, 77d) where the motor 73 is positioned. These positioning portions 77 have arcuate shapes at their free ends, and four arcuate lines thereof provide a dimensional relationship such that the arcuate lines provide the inner diameter and define a concentric circle. This inner diameter is the same as the diameter of the flange portion 73c (part (a) of FIG. 8), and the flange portion 73c engages with the positioning portions 77, so that the motor 73 is positioned relative to the stay 75 and is mounted to the first 75a. The positioning portions 77 of the motor 73 may only be required to be at least two positioning portions.

That is, the stay has a two-layer structure by the drawing, in which the motor 73 is positioned and mounted to the first surface 75a and the second surface 75a is provided with the through holes 78 in which positioning of the supporting shafts 76 is carried out. Further, when the supporting shafts 76 and the motor 73 are assembled with the stay 75, in order to avoid an interference of the supporting shafts 76 with the motor 73, the second surface 75b in which the through holes 78 are formed is offset from the first surface 75a to which the motor 73 is mounted. That is, the first surface 75a and the second surface 75b of the stay 75 are somewhat shifted from each other and are connected with each other in the axial direction of the supporting shafts 76 so that the supporting shafts 76 and the motor 73 do not interfere with each other.

Further, the supporting shafts 76 of the idler gears 72 are supported at both ends between the stay 75 and the side plate 12, and therefore, the falling rigidity of the supporting shafts 76 can be further improved. Accordingly, a rotation operation of the idler gears 72 can be further stabilized and stability of drive transmission can be improved, and thus lead to a reduction in operation noise.

Further, the four drawing portions 75c which are increased in number than the three drawing portions 75c in First Embodiment, so that the torsional rigidity of the second surface 75b can be further improved. Incidentally, the rigidity of the second surface 75b against the load can be adjusted by appropriately changing the number of connecting portions, a connection width and a connecting position between the first surface 75a and the second surface 75b of the stay 75.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-190679 filed on Sep. 29, 2016, which is hereby incorporated by reference herein in its entirety.

What is claimed is:

1. A driving device comprising:
   a motor including a driving shaft;
   a stay supporting the motor;
   a gear configured to receive a driving force from the motor; and
   a supporting shaft rotatably supporting the gear, the supporting shaft being fixed to the stay,
   wherein the motor is fixed on a first surface of the stay, and
   the supporting shaft extends from a second surface, opposite from the first surface, of the stay,
   wherein the stay comprises a first region where the motor is fixed and a second region being away from the first region in an extending direction of the driving shaft,
   wherein the driving shaft penetrates the second region of the stay in the extending direction, and the supporting shaft is fixed to the second region.

2. A driving device according to claim 1, wherein the supporting shaft is fixed to the stay by caulking.

3. A driving device according to claim 1, wherein the stay is provided with a hole for permitting penetration of the driving shaft of the motor through the hole.

4. A driving device according to claim 1, wherein when the motor and the supporting shaft are viewed in the extending direction, the supporting shaft and the motor are disposed at overlapping positions.

5. A driving device according to claim 1, wherein the stay is formed with a metal plate.

6. A driving device according to claim 1, wherein the second region is offset from the first region by deep drawing.

7. An image forming apparatus comprising:
   an image forming portion configured to form an image on a recording material; and
   a driving device according to claim 1.

8. A driving device comprising:
   a motor;
   a first metal plate supporting said motor and including a first surface where said first metal plate supports said motor and a second surface opposite from said first surface;
   a second metal plate provided on the second surface;
   a gear configured to receive a driving force from said motor; and
   a supporting shaft rotatably supporting said gear, said supporting shaft being supported by said second metal plate,
   wherein a driving shaft of said motor penetrates said first metal plate in an extending direction of said driving shaft;
   wherein said first metal plate is provided with a hole for permitting penetration of said supporting shaft through the hole, and
   wherein said first metal plate supports said motor in a first region and is provided with the hole in a second region, and said first metal plate in the second region is away from said first metal plate in the first region in the extending direction.

9. A driving device according to claim 8, wherein when said motor and said supporting shaft are viewed in the extending direction, said supporting shaft and said motor are disposed at overlapping positions.

10. A driving device according to claim 8, wherein said first metal plate in the second region is offset from said first metal plate in the first region by drawing.

11. An image forming apparatus comprising:
    an image forming portion configured to form an image on a recording material; and
    a driving device according to claim 8.

* * * * *